(12) United States Patent
Kayser et al.

(10) Patent No.: US 6,593,448 B2
(45) Date of Patent: Jul. 15, 2003

(54) NANOMETRIC TIO2-CATALYZED PRODUCTION OF POLYAMIDES

(75) Inventors: Dominique Kayser, Ste Colombe (FR); Jean-François Thierry, Francheville (FR); Joël Varlet, Lyons (FR)

(73) Assignee: Rhodianly, Boulogne Billancourt (FR)

( * ) Notice: Subject to any disclaimer, the term of this patent is extended or adjusted under 35 U.S.C. 154(b) by 0 days.

(21) Appl. No.: 09/887,047

(22) Filed: Jun. 25, 2001

(65) Prior Publication Data

US 2002/0042498 A1 Apr. 11, 2002

Related U.S. Application Data

(63) Continuation of application No. PCT/FR99/03233, filed on Dec. 21, 1999.

(30) Foreign Application Priority Data

Dec. 23, 1998 (FR) .............................................. 98 16588

(51) Int. Cl.⁷ ......................... C08G 69/04; C08G 69/16; C08G 69/28
(52) U.S. Cl. ........................ 528/310; 528/312; 528/322; 528/323; 528/332; 528/335; 528/336; 528/342; 528/318; 525/419; 525/420
(58) Field of Search ................................. 528/310, 312, 528/322, 332, 335, 336, 323, 342, 318; 525/419, 420

(56) References Cited

U.S. PATENT DOCUMENTS

| | | | | |
|---|---|---|---|---|
| 3,944,518 A | * | 3/1976 | Burrows et al. | 524/99 |
| 4,912,175 A | | 3/1990 | Wheland et al. | |
| 5,142,000 A | * | 8/1992 | Wheland | 525/420 |
| 6,020,419 A | * | 2/2000 | Bock et al. | 524/590 |

FOREIGN PATENT DOCUMENTS

| | | |
|---|---|---|
| DE | 25 54 788 A | 6/1977 |
| DE | 280 766 A1 | 7/1990 |
| FR | 2 744 914 A1 | 8/1997 |

* cited by examiner

Primary Examiner—P. Hampton-Hightower
(74) Attorney, Agent, or Firm—Burns, Doane, Swecker & Mathis, L.L.P.

(57) ABSTRACT

(Co)polyamides, for example the polyamides 6 and 66, are prepared via the improvedly catalyzed polycondensation of (co)polyamide-forming (co)monomers, even in the presence of normally catalyst-inhibiting matting agents (e.g., microparticulate $TiO_2$), the catalyst therefor comprising solid nanometric $TiO_2$ particulates having diameters of less than 100 nm.

17 Claims, No Drawings

NANOMETRIC TIO2-CATALYZED PRODUCTION OF POLYAMIDES

CROSS-REFERENCE TO PRIORITY/PCT APPLICATIONS

This application claims priority under 35 U.S.C. §119 of FR-98/16588, filed Dec. 23, 1998, and is a continuation of PCT/FR99/03233, filed Dec. 21, 1999 and designating the United States (published in the French language on Jul. 6, 2000 as WO 00/39193; the title and abstract were also published in English), both hereby expressly incorporated by reference.

BACKGROUND OF THE INVENTION

1. Technical Field of the Invention

The present invention relates to an improved process for the production of polyamides and, more especially, relates to the nanometric titanium dioxide-catalyzed polycondensation of polyamide-forming monomers.

2. Description of the Prior Art

The production of polymers of polyamide type is principally carried out via polycondensation of dicarboxylic acid monomers and diamine comonomers, or compounds of lactam or amino acid type. These polycondensation reactions can be accelerated by catalysis. Much research has been conducted on active catalysts and on techniques for the introduction/use thereof.

Among the known catalysts, those containing phosphorus have been the subject of considerable research. U.S. Pat. No. 3,944,518 describes the use of phosphoric acid as a polycondensation catalyst for the production of polyamide 66 (nylon 66), this phosphoric acid being introduced with the hexamethylenediamine into the polymerization medium. U.S. Pat. No. 4,912,175 describes phosphonic polymerization catalysts such as, for example, 2-(2'-pyridyl) ethylphosphonic acid or diethyl 2-(2'-pyridyl) ethylphosphonate.

Employing these catalysts makes it possible to increase the polyamide polycondensation kinetics. However, for catalysts containing phosphorus, their catalytic effect is generally almost entirely inhibited or poisoned in the presence of matt-effect or matting agents, for example coated titanium dioxide. Such agents are included, in particular, for textile applications in order to reduce the translucency of fibers, for example for the manufacture of women's footwear. These are generally composed of micrometer-sized titanium dioxide compounds in proportions ranging from 0.3% to 2% by weight. Micrometric titanium dioxide is selected because of its ease of use and its whiteness. It is generally incorporated into the polymerization medium at the start of the process. It is advantageously passivated, for example with a protective layer, to limit the photochemical degradation of the polymer in its presence. The protective layers are generally based on silica and can contain alumina. The presence of matt-effect or matting agents and particularly of passivated matting agents greatly reduces the catalytic efficacy of the compounds used to accelerate the polymerizations.

SUMMARY OF THE INVENTION

A major object of the present invention is the provision of improved titanium dioxide ($TiO_2$) polycondensation catalysts.

Briefly, the catalysts according to the present invention comprise solid particles of nanometer-sized titanium dioxide. By the term "nanometer-sized" is intended that the average diameter of the particulates or their average size is less than about 100 nm.

The subject catalysts are useful for the manufacture of all types of polyamides, or of copolymers based on polyamides. They are effective, for example, for the production of polyamides prepared via the polymerization of lactams or amino acids, such as caprolactam or 6-aminohexanoic acid, or for the production of polyamides prepared via copolymerization of dicarboxylic acid monomers and diamine monomers. The nanometric $TiO_2$ particulates of this invention are particularly well suited for catalysis of the condensation of adipic acid and hexamethylenediamine. Same are adapted for the manufacture of any composition based on polyamides and of any copolymer based on polyamides.

DETAILED DESCRIPTION OF BEST MODE AND SPECIFIC/PREFERRED EMBODIMENTS OF THE INVENTION

More particularly according to the present invention, in one embodiment thereof, the surface of the catalyst based on nanometric titanium dioxide is coated with a compound other than titanium dioxide, for example silica. The coating at the surface of the catalyst need not be continuous and can be present at the surface of the particles, for example in the form of agglomerations. The catalyst concentrations can depend on the surface state of the particles and on their method of preparation. Such concentrations are advantageously greater than 100 ppm by weight relative to the weight of monomers.

Polymerizations of dicarboxylic acid monomers and diamine comonomers generally comprise three steps. The first step is the concentration of a carboxylate-ammonium di-salt in water, known as "salt N". This step is followed by an amidation (condensation of the acid and amine functions), in particular under pressure. The condensation is then continued under atmospheric pressure up to the desired degree of polymerization. This final step is referred to as "finishing." For this type of polymerization, the catalyst can be introduced into the salt N, for example during the amidation phase at high pressure.

Polymerizations of lactams and amino acids are generally carried out in the following manner: polyaddition of the monomers at a temperature of from 200° C. to 300° C. beginning with a mixture of monomer and water, granulation of the product thus obtained, washing of the granules with water to extract therefrom the monomers or oligomers of low molecular weight, and drying. The catalyst can be introduced, for example, into the mixture of monomer and water.

The nanoparticulate titanium dioxide can be introduced into the condensation reactor either directly in powder form, or in the form of a suspension or dispersion in a liquid medium. The said liquid medium can be water or a molten polyamide composition.

The nanoparticulate titanium dioxide catalyses the polymerization of all polyamide-based compositions. Its use is particularly advantageous when the product manufactured is a composition containing a matting agent. Inhibition of the catalytic effect with such an agent is less pronounced than with a phosphorus-based catalyst. This property is confirmed, in particular, in the presence of a matt-effect agent based on titanium dioxide having a particle size on the order of one micrometer. For example, the catalysts according to the present invention remain effective in the presence of titanium dioxide coated or partially coated with a silica-based compound, comprising particles having a diameter of greater than 1 μm.

The subject catalysts are particularly advantageous compared with other catalysts, when the content of matting agent in the compositions is greater than 0.5% by weight.

In order to further illustrate the present invention and the advantages thereof, the following specific examples are given, it being understood that same are intended only as illustrative and in nowise limitative.

EXAMPLE 1

A suspension at a concentration of 20% in water of titanium dioxide particles having a diameter of about 50 nm, prepared according to the first two steps described in Example 1 of FR-2,744,914, was introduced into a polyamide 66 condensation reactor during the amidation phase under pressure, such as to obtain in the reactor a proportion of catalyst of 500 ppm by weight relative to the polymer. The condensation was carried out at a temperature of 275° C.

After finishing for 45 minutes, the viscosity index of the polymer obtained was 145 ml/g.

An identical process carried out in the absence of catalyst provided a viscosity index of 135 ml/g after finishing for 45 minutes.

The viscosity indices (VIs) were measured at 25° C. using a Ubbelohde-type viscometer for a solution containing 5 g/l of polymer dissolved in a mixture of 90% by weight of formic acid and 10% of water.

EXAMPLE 2

The catalytic efficacy of a catalyst is defined by the difference in the amidation kinetic constants $k_1$, after finishing in the presence and absence of catalyst relative to the kinetic constant $k_1$, in the absence of catalyst.

$$efficacy = \frac{k_{1\ catalysis} - k_{1\ without\ catalysis}}{k_{1\ without\ catalysis}}$$

The constant $k_1$, is defined by the following system:

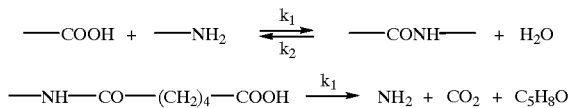

The kinetic equations are as follows:

$$\frac{d[COOH]}{dt} = [-k_1[COOH][NH_2] + k_2[CONH][H_2O]][COOH] - k_3[COOH]$$

$$\frac{d[NH_2]}{dt} = [-k_1[COOH][NH_2] + k_2[CONH][H_2O]][COOH] + k_3[COOH]$$

$$\frac{d[COOH]}{dt} = [k_1[COOH][NH_2] - k_2[CONH][H_2O]][COOH] - k_3[COOH]$$

in which [COOH] is the concentration of acid end groups, [NH$_2$] is the concentration of amine end groups, [NHCO] is the concentration of amide units and [H$_2$O] is the concentration of water.

[COOH] and [NH$_2$] were measured by potentiometric assay, [H$_2$O] was determined by measuring the partial pressure of water $P_{H2O}$ in the condensation reactor: log $([H_2O]/P_{H2O})=1800/T-1.2214$, in which T is the temperature in kelvins, $P_{H2O}$, is the partial pressure of water in bar and [H$_2$O] is the concentration of water in meq/kg.

[CONH] was determined by a material balance.

A polyamide 66 was prepared according to conventional process without matt-effect agent, in the presence either of a typical catalyst comprising phosphorus, or of catalyst according to the invention. A polyamide 66 in the absence of catalyst was prepared according to the same process.

A polyamide 66 composition was prepared comprising microparticulate titanium dioxide coated with silica (matt-effect agent) in a proportion of 1.6% by weight. The catalytic effect obtained was measured using the same catalysts.

Relative to the catalytic effect observed in the absence of matt-effect agent, a 95% reduction in the catalytic efficacy of a phosphoric acid in a proportion of 8.4 ppm was observed in the presence of the matt-effect agent.

For a catalyst composed of titanium dioxide particles having a diameter of about 50 nm, partly coated with silica and concentrated to 2,000 ppm, prepared according to the four steps of Example 1 of FR-2,744,914, a 69% reduction in the catalytic efficacy was observed.

The activity of the catalyst according to the present invention was thus less inhibited than that of a phosphorus-containing catalyst in the presence of a matt-effect agent.

EXAMPLE 3

A polyamide 6 was prepared in the presence and absence of catalyst. The catalyst used was nanoparticulate titanium dioxide treated with silica, prepared according to the four steps of Example 1 of FR-2,744,914.

The polymerization process was as follows: a mixture of 70% by weight of caprolactam and 30% by weight of water was concentrated by heating to 80% by weight of caprolactam. The concentrated mixture was adjusted to a pressure of 17.5 bar and distilled at this pressure. The product obtained was returned to atmospheric pressure and subjected to finishing at 270° C.

The catalyst was introduced, in a proportion of 2,000 ppm by weight relative to the polymer, into the initial mixture of caprolactam and water.

In the absence of catalyst, the viscosity index after finishing was 130 ml/g.

In the presence of the catalyst, the viscosity index after finishing was 145 ml/g.

While the invention has been described in terms of various specific and preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. In a process for the production of a (co)polyamide via the catalyzed polycondensation of (co)polyamide-forming (co)monomers, the improvement which comprises, as the catalyst therefor, solid nanometric titanium dioxide (TiO$_2$) particulates having diameters of less than 100 nm.

2. The process as defined by claim 1, said catalyst comprising at least partially coated solid nanometric TiO$_2$ particulates.

3. The process as defined by claim 2, said solid nanometric TiO$_2$ particulates being at least partially coated with a silica-based compound.

4. The process as defined by claim 1, said (co)polyamide-forming (co)monomers comprising a matting agent.

5. The process as defined by claim 4, said matting agent comprising particulates of $TiO_2$ having diameters greater than 1 μm.

6. The process as defined by claim 5, said particulates of $TiO_2$ having diameters greater than 1 μm being at least partially coated with a silica and/or alumina compound.

7. The process as defined by claim 4, said (co)polyamide-forming (co)monomers comprising greater than 0.5% by weight of said matting agent.

8. The process as defined by claim 1, said (co)polyamide-forming (co)monomers comprising a lactam or an amino acid.

9. The process as defined by claim 1, said (co)polyamide-forming (co)monomers comprising a dicarboxylic acid and a diamine.

10. The process as defined by claim 9, said (co)polyamide-forming (co)monomers comprising adipic acid and hexamethylenediamine.

11. The process as defined by claim 9, said (co)polyamide-forming (co)monomers comprising admixture of carboxylate-ammonium di-salt, water and the nanometric $TiO_2$ catalyst particulates.

12. The process as defined by claim 1, said nanometric $TiO_2$ catalyst particulates being concentrated in a liquid medium.

13. The process as defined by claim 12, said liquid medium comprising water.

14. The process as defined by claim 12, said liquid medium comprising a molten polyamide.

15. A (co)polyamide prepared via the catalyzed polycondensation of (co)polyamide-forming (co)monomers, the catalyst therefor comprising solid nanometric $TiO_2$ particulates having diameters of less than 100 nm.

16. The (co)polyamide as defined by claim 15, comprising a polyamide 66.

17. The (co)polyamide as defined by claim 15, comprising a polyamide 6.

* * * * *

UNITED STATES PATENT AND TRADEMARK OFFICE
CERTIFICATE OF CORRECTION

PATENT NO. : 6,593,448 B2
DATED : July 15, 2003
INVENTOR(S) : Kayser et al.

It is certified that error appears in the above-identified patent and that said Letters Patent is hereby corrected as shown below:

<u>Title page,</u>
Item [73], Assignee, change "Rhodianly" to -- Rhodianyl --.

Signed and Sealed this

Ninth Day of December, 2003

JAMES E. ROGAN
*Director of the United States Patent and Trademark Office*